May 20, 1924.

E. NIELSEN 1,494,561

COMBINATION TIDE GAUGE AND RECORDING APPARATUS

Filed Dec. 19, 1921

INVENTOR.
ENDRE NIELSEN.
BY Chas. E. Trommald
ATTORNEY.

May 20, 1924.

E. NIELSEN

COMBINATION TIDE GAUGE AND RECORDING APPARATUS

Filed Dec. 19, 1921

INVENTOR.
ENDRE NIELSEN
BY
Chas. E. Townsend
ATTORNEY.

Patented May 20, 1924.

1,494,561

UNITED STATES PATENT OFFICE.

ENDRE NIELSEN, OF OAKLAND, CALIFORNIA.

COMBINATION TIDE GAUGE AND RECORDING APPARATUS.

Application filed December 19, 1921. Serial No. 523,416.

*To all whom it may concern:*

Be it known that I, ENDRE NIELSEN, a subject of the King of Norway, residing at Oakland, in the county of Alameda and State of California, have invented new and useful Improvements in Combination Tide Gauge and Recording Apparatus, of which the following is a specification.

This invention relates to a combination gauge and recording apparatus, and especially to a device of this character which is adapted for graphically recording and visibly indicating the rise and fall of water in navigable rivers, harbors, etc.

One of the objects of the present invention is to generally improve and simplify an apparatus of the character described; to provide a gauge and recording device which will graphically and visibly record and indicate tide conditions and changes, and the exact time of such changes; and apparatus which, while sensitive to gradual tide changes, will not record nor be affected by wave action; further an apparatus which may be readily and accurately adjusted to suit varying conditions, such as scale, speed of travel, and length of the graphic recording sheet employed, tide variations, etc.

Other objects will hereinafter appear.

The invention consists of the parts, and the construction, combination and arrangement of parts as hereinafter more fully described and claimed, having reference to the accompanying drawings, in which—

Fig. 1 is a front view of the combined gauge and recording apparatus.

Figure 4:
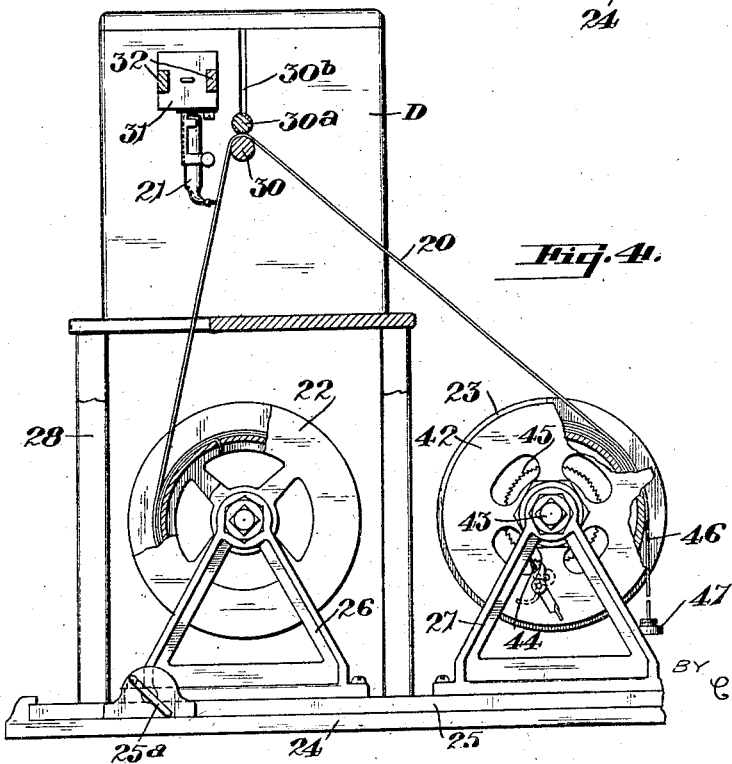

Fig. 4 is a side elevation of the recording mechanism partially in section.

Figure 1:
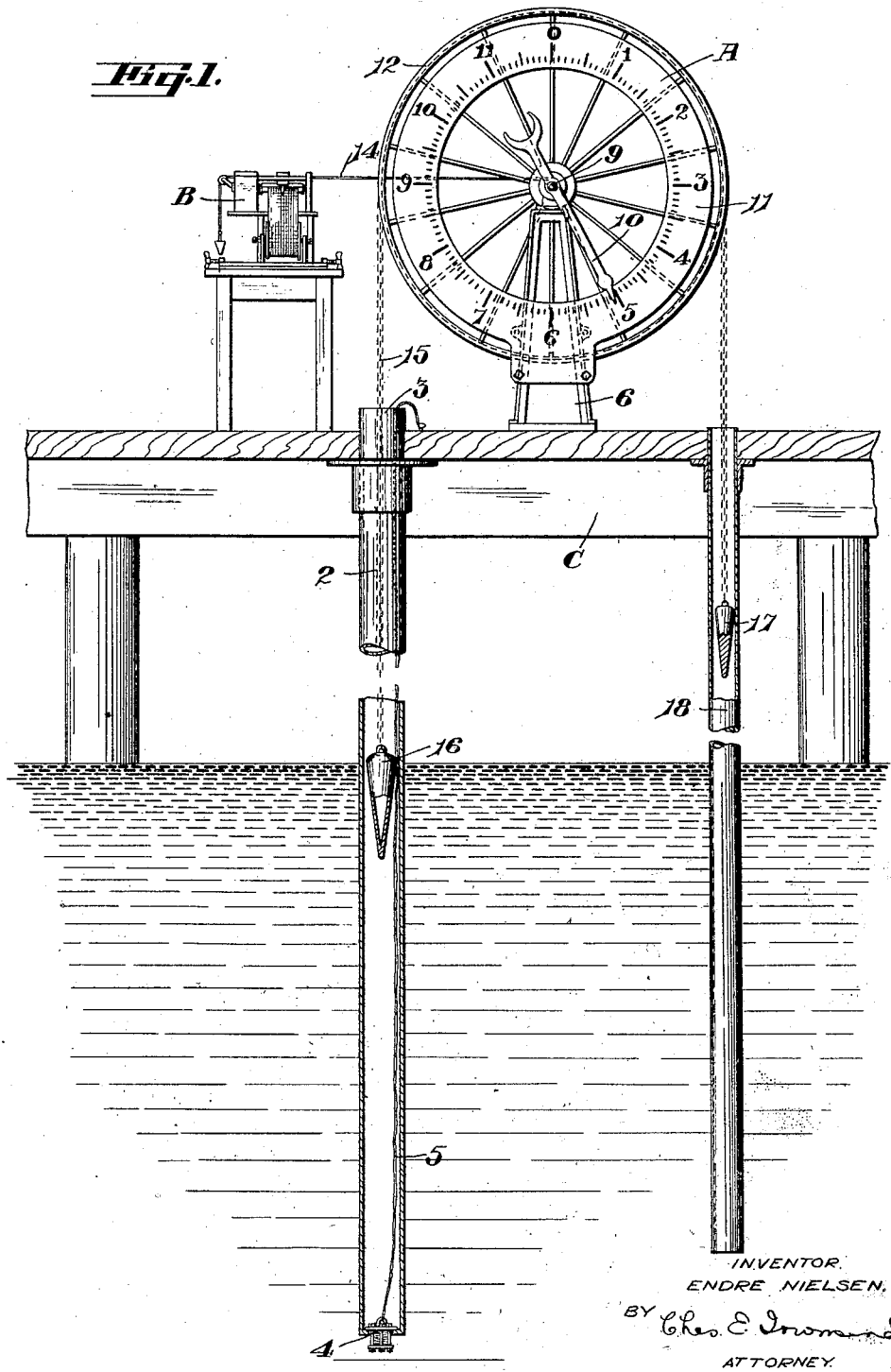
Figure 2:
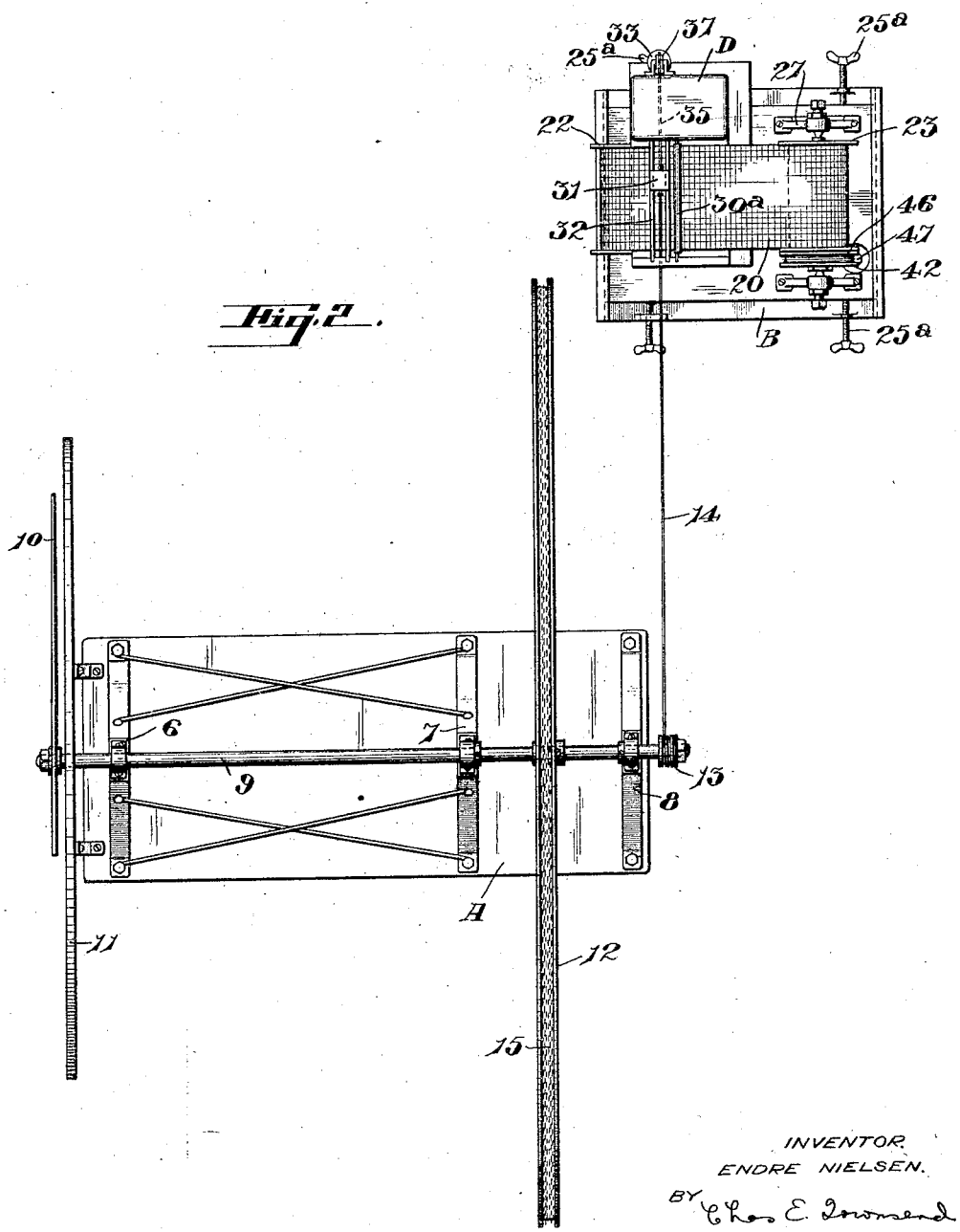
Fig. 2 is a plan view thereof.

Referring to the drawings in detail, and particularly to Figs. 1 and 2, A indicates in general the tide gauge and B the graphic recording mechanism employed. The tide gauge proper consists of a tube 2, which extends downwardly into the water of a river, bay or the like; the tube being preferably of such a length that it extends a considerable distance below the lowest probably occurring tide of the particular locality in which the apparatus as a whole is installed. The tube is opened at its upper end, as indicated at 3, while its lower end is partially closed by a filter generally indicated at 4. This filter serves two functions, first that of restraining a free flow of water into and out of the tube, and secondly that of preventing admission of foreign matter, whether it be in the form of a flotsam, water growths, animal life or the like. The lower end of the tube 5 is provided with an annular seat 5' on which the filter 4 is normally seated, as shown particularly in Fig. 1.

The filter in reality consists of nothing more or less than a pair of perforated plates between which is introduced a filtering medium, such as bamboo, shavings or any other suitable fibrous material. The filter is in this instance attached to a cord 5, which extends to the top of the tube, said cord serving the function of removing the filter from time to time if the filtering medium should require renewal, cleaning or otherwise. By virtue of the cord 5 and its connection with the filter 4, and extending through the tube 2, the filter may be seated upon its seat 5' or removed therefrom at will without the necessity of one going below the level of the water to gain access to the filter for purposes of repair or removal of the same.

The tide gauge and the recording mechanism cooperating therewith may be supported on a wharf or other suitable structure, generally indicated at C, and it may be enclosed in a housing or the like not here shown to protect the mechanism as a whole against wind and weather.

Disposed on the support C, at any convenient place, are three bearing pedestals, generally indicated at 6, 7 and 8. Supported by said pedestals and journaled in bearings formed at their upper ends is a shaft 9, and secured to the shaft is an indicating hand 10, which cooperates with a tide dial 11. Also secured on the shaft is a pair of wheels or pulleys generally indicated at 12 and 13. The wheel 12 is of large diameter for purposes hereinafter to be described, while the wheel or pulley 13 is of exceedingly small diameter, the face of said pulley being provided with a spiral groove for the reception of a cord 14. The function of said small pulley and cord will later be described.

The face of the large wheel or pulley 12 is grooved to receive a flexible cord or chain such as shown at 15. This cable or chain may be wound one turn about the pulley to avoid slippage, one end of the chain being attached to a float 16 mounted interior of the tube 2, while the other end of the chain is attached to a weight 17, which is adapted to rise and fall within a tube 18. This tube is of a length substantially equal to the tube 2, but the lower end of the tube 18 is capped or closed to exclude water therefrom. In other words tube 18 merely forms a guide for the counterweight.

The gradual rise or fall of water in rivers, harbors or other places which are affected by tidal changes, will in this instance cause a slow rotation of the pulley 12 and the shaft 9 to which it is secured, that is water entering the tube 2 through the filter 4 will naturally seek a level with the exterior or surrounding water, and as the tide gradually rises or falls, a similar rise or fall will occur within the tube. The float 16 will thus rise and fall therewith and a corresponding movement will be transmitted to the pulley 12 and the shaft 9, due to the cooperation of the counterweights 17. The filter 4, as previously stated, does not only exclude foreign matter, but restricts the entrance of water to such an extent that the tide gauge will only be affected by the gradual rise and fall of the tide. Any other disturbances such as may be caused by wave action, etc., will not affect the gauge as the entrance of water is so restricted by the filter as to prevent momentary or temporary action as far as the gauge is concerned.

Figure 3:
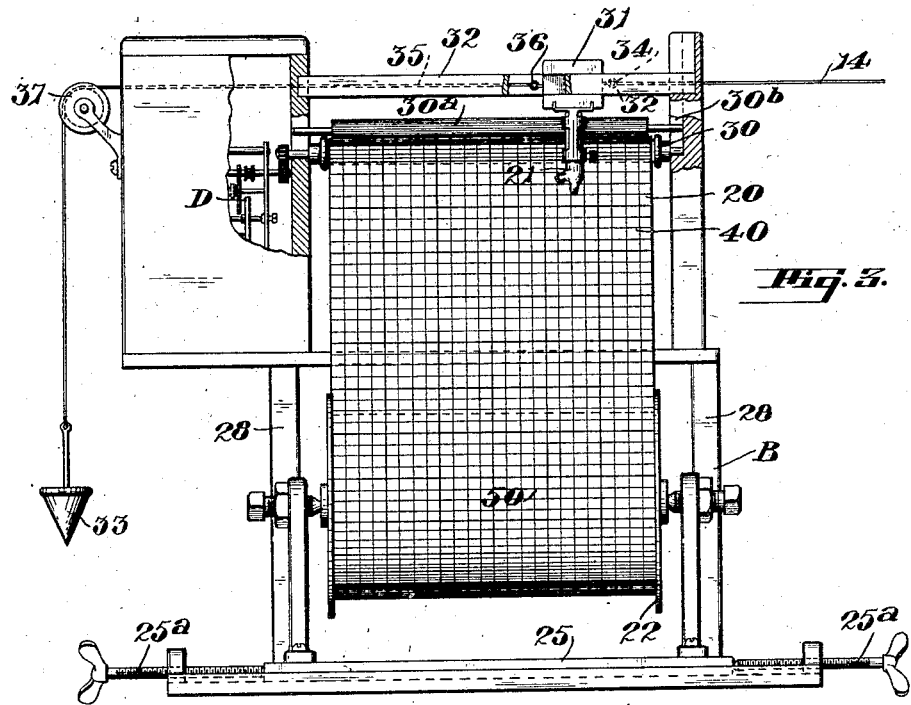
Fig. 3 is an end view of the recording mechanism.

The present tide gauge is provided with means for visibly and graphically recording the tide changes. The visible indication is obtained by the use of the hand 10 and the tide dial 11. This dial is graduated into feet and tenths thereof, as shown in Fig. 1, and the numerals displayed will practically, in every instance, be additive, that is the numeral indicated by the hand will give the elevation of each tide above or below the level of coast survey chart soundings. The numerals are therefore always additive to chart depths unless such indicated depths are preceded by a minus or dash when the chart depth will be subtracted from the numeral indicated on the dial. The graphic recording mechanism employed is best illustrated in Figs. 3 and 4. The mechanism in general consists of a clock actuated driving mechanism indicated at D, a recording sheet 20, a stylus 21, a supply roller 22 and a receiving or winding roll 23. The entire recording mechanism is carried by a main base plate 24. Adjustably mounted on said base plate is an auxiliary base plate 25, and carried thereby are first of all journal members 26 and 27 by which the respective rolls 22 and 23 are carried, and secondly an upright frame 28 which carries the clock mechanism D, the stylus mechanism 21, and the feed or driving roll 30.

Any suitable form of stylus may be employed and it will in this instance be supported by a carriage 31, which is adapted to travel laterally with relation to the recording sheet 26, that is a pair of track members 32 extend between the side sections of the frame 28 and form a support and a guide for the carriage and movement is transmitted to the carriage through means of the cable 14 previously referred to and the counterweight 33. One end of the cord 14 is secured to one side of the carriage, as at 34, while the opposite end is attached to the pulley 13. A second cord 35 is attached to the opposite side of the carriage, as at 36, and this cord is extended over a pulley 37 and finally attached to the counterweight 34, thus maintaining the cables 35 and 14 intact, and providing means whereby transverse movement may be transmitted to the carriage in either direction. The recording sheet is carried by the supply roll 22. It passes upwardly between the frame sections 28 and over the driving roller 30. It is then passed downwardly about the winding drum 23 and is here secured in any suitable manner. The recording sheet is graduated or lined longitudinally to indicate feet and fractions thereof as shown at 40 and it is graduated transversely or crosswise of the sheet to indicate the hour of day, minute, etc. The sheet may be of such a length that it will run continuously for a week or a month; this feature being however of comparatively little importance as a change in the sheet may be resorted to every day if so desired.

To rotate the winding roll 23, a weight actuated driving mechanism is employed. This mechanism consists of a pulley 42 loosely journaled on a shaft 43, which carries the winding drum. Mounted on the pulley 42 is a pawl 44, and secured on the end of the winding drum is a ratchet gear 45 with which the pawl may be thrown into or out of engagement. Wound a considerable number of turns about the pulley 42 and secured thereto is a cord 46, and attached to the free end of the cord is a weight 47. This weight tends to rotate the pulley 42 in the direction of the arrow as indicated in Fig. 4, and such rotary movement is transmitted to the winding pulley 23 through means of the pawl and ratchet. A number of removable weights may be employed in connection with the main weight 47 and it is therefore possible to increase or decrease the tension of the recording sheet and to a certain extent the speed of the clock mechanism.

To maintain a positive drive between the recording sheet and the clock mechanism, or the roller 30 driven thereby, a weighted roller 30$^a$ is employed. This roller merely rests by its own weight on top of the record sheet and thereby maintains frictional engagement between the recording sheet and the driving or speed regulating roll 30. The roller 30ᵃ may be readily removed when it is desired to change or replace the recording sheet as it is merely guided by side channels or slots 30ᵇ, or which may be removed by lifting in a vertical direction.

In actual operation it can readily be seen that the gradual rise and fall of the tide will cause a slow rotation of the large diameter pulley 12 and that such slow movement will be transmitted to the shaft 9. This movement is again transmitted to the carriage 31 by which the stylus is supported through means of the pulley 13, the cords 14 and 35 and the counterweight 33. The peripheral travel of the chain or cable passing about the pulley 12 will be equal to the actual rise and fall of the tide, while the lateral movement of the carriage 31 will be comparatively small. This is due to the exaggerated or great difference in diameter between the pulleys 12 and 13 employed, and is of great importance in the present instance as any exterior or temporary disturbances, which might cause a rapid rise or fall of the water, might to a slight extent affect the uniform movement of the large pulley. Such movement however is not recorded or indicated on the sheet as the travel of the carriage is so small when comparison is made with the peripheral travel of the pulley 12 that such disturbance will not be recorded. Therefore it can be seen that only such movement as is caused by the actual rise and fall of the tide will be visibly displayed and recorded on the sheet as shown by the line 50. Such exterior disturbances which might affect the gauge and the graphic recording mechanism are also checked by restraining the inflow and outflow of the water in the tube 2 by means of the filter 4.

The speed of the clock mechanism will naturally be such that the recording sheet will be advanced one hour graduation during each actual hour of time. However if the recording sheet should show a slight lag, it is possible to correct such error either by regulating the mechanism of the clock in the usual manner, or by adding an auxiliary weight to the main weight 47, which actuates the rewinding drum, that is a slight excess weight at this point will increase the tension of the recording sheet 20, or in other words exert a slightly greater pull on the roll 30, thereby increasing the speed of the clock mechanism. Again if the rate of travel should be in excess of that desired, it is possible to correct it by either adjusting the clock mechanism or removing one or more of the auxiliary weights. The main weight 47 and the auxiliary weights are attached to the cable 46 and it is obvious that this cable will have to be rewound about the pulley 42 from time to time. Such rewinding is accomplished by merely releasing the pawl 44 when pulley 42 may be turned in a reverse direction until the cable 46 is rewound, when engagement may again be made with the ratchet wheel to permit the normal functioning thereof. If it is desired to replace the recording sheet, it is only necessary to remove it with relation to the drum 23 and to apply a new sheet of any length desired. Such operation should be obvious from the general structure of the apparatus shown.

An important feature of the invention, besides adjustability and regulation of the speed of travel of the recording sheet, is lateral adjustability of the entire recording mechanism with relation to the base 24. Such lateral adjustability is permitted by employing the auxiliary base 25 and set screws 25ᵃ at each side thereof; any suitable number desired being disposed on each side. These screws engage the respective sides of the auxiliary base and thereby permit lateral adjustment of the same. Such adjustment is essential when the apparatus is installed as only thereby can correct tide reading be obtained.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or varying uses may demand.

Having thus described my invention, what I claim and desire to secure by Letters Patent is—

1. In a device of the character described, a recording mechanism comprising a main base plate, a secondary base plate supported thereby, means permitting lateral adjustment of said base plate, a combined winding and receiving drum carried by the second base plate, a supply drum also carried by the second base plate in parallelism with the receiving and winding drum, a frame carried by the second base plate and within which the receiving drum is located, a clock mechanism supported on said frame and laterally offset from the latter, a casing for the clock mechanism provided with an opening, a roller mounted above the supply drum and extending through the opening of the clock casing and operatively connected to the clock mechanism to be driven by the latter, the combined winding and receiving drum being disposed outside of said frame, a recording sheet operatively connected to the aforesaid drums and passing over said roller and driven by said roller, track members connected to said frame, a stylus depending from said track members and engaging the recording sheet between the supply drum and said roller and movable transversely with relation to the recording sheet, and means for transmitting a turning movement to the combined winding and receiving drum.

2. A combination tide gauge and recording mechanism comprising a support located over a body of water, spaced tubes connected to said support and depending therefrom and extending into the water, one of the tubes being smaller in diameter than the other and being closed at its lower end, a shaft journaled on said support, a relatively large wheel secured to said shaft, a graduated tide dial mounted on said shaft adjacent said wheel, a hand secured on the shaft for coaction with the dial, a pulley of relatively small diameter secured on the shaft, a clock driven recording sheet, a stylus cooperating with the recording sheet, means actuated by the small pulley for transmitting transverse movement to the stylus with relation to the recording sheet, a float in the larger of the adjacent tubes, a counterweight in the smaller of the adjacent tubes, a cable connected to said wheel and having its ends extending into said tubes for connection with the float and the counterweight whereby upon the rise and fall of tides to rotate said wheel and shaft and also rotate said pulley to effect operation of the stylus with relation to the recording sheet and to visibly indicate the degree of rise and fall of tides on the dial, the open end of the larger tube being opened, and means located at the lower open end of the larger tube to shield the float against abnormal rise and fall of tides to thereby restrain abnormal action of the stylus with relation to the recording sheet.

3. A combination tide gauge and recording mechanism comprising a float, a wheel adapted to be rotated thereby, a clock driven recording sheet, a stylus cooperating therewith, means actuated by the wheel for transmitting transverse movement to the stylus with relation to the recording sheet, means including a tube and a filter for shielding the float against abnormal rise and fall of tides to thereby restrain abnormal action of the stylus with relation to the recording sheet, and means for inserting and removing the filter through the upper end of the tube at will.

4. A combination tide gauge and recording mechanism comprising a float, a wheel adapted to be rotated thereby, a clock driven recording sheet, a stylus cooperating therewith, means actuated by the wheel for transmitting transverse movement to the stylus with relation to the recording sheet, means including a tube and a filter for shielding the float against abnormal rise and fall of tides to thereby restrain abnormal action of the stylus with relation to the recording sheet, the lower end of the tube having an opening and a surrounding seat for the filter, and means for seating the filter on the seat through the upper end of the tube and for removing the filter from its seat through the upper end of the tube.

5. A device of the character described comprising a support, a shaft journaled in the support, a relatively large wheel secured to the shaft, a graduated tide dial concentric with and disposed at one end of the shaft and stationary with relation thereto and arranged adjacent the wheel, a pulley of relatively small diameter secured to the shaft, a hand secured on the shaft and turnable with relation to the dial, a clock driven recording sheet, a stylus cooperating therewith, means actuated by said pulley for transmitting transverse movement to the stylus with relation to the recording sheet, a float, a chain attached thereto and passing over the wheel, a counterweight attached to the opposite end of the chain, a pair of tubes, one enclosing the float and the other enclosing the counterweight, both tubes extending into the water, the lower end of the float tube being open, means for excluding water from the counterweight tube, and means at the lower end of the float tube for restricting the inflow and outflow of water from the float tube so as to protect the float against abnormal rise and fall of tides to thereby restrict abnormal action of the stylus with relation to the recording sheet.

6. A device of the character described comprising a support, a shaft journaled in the support, a relatively large wheel secured to the shaft, a graduated tide dial concentric with and disposed at one end of the shaft and stationary with relation thereto and arranged adjacent the wheel, a pulley of relatively small diameter secured to the shaft, a hand secured on the shaft and turnable with relation to the dial, a clock driven recording sheet, a stylus cooperating therewith, means actuated by said pulley for transmitting transverse movement to the stylus with relation to the recording sheet, a float, a chain attached thereto and passing over the wheel, a counterweight attached to the opposite end of the chain, a pair of tubes, one enclosing the float and the other enclosing the counterweight, both tubes extending into the water, the lower end of the float tube being opened and having a seat at its lower end, and a filter constructed to be positoned on said seat and removed therefrom at will through the upper end of the tube, the said filter being adapted to prevent abnormal rise and fall of the tides from abnormally acting upon the stylus with relation to the recording sheet.

7. A combination tide gauge and recording sheet mechanism comprising a float, a wheel adapted to be rotated thereby, a graduated tide dial, a hand movable with relation thereto, means actuated by the wheel for transmitting turning movement to the hand, a tube extending into the water and enclosing a float and open at its lower end, and a filter at the lower end of the tube to exclude foreign matter from the tube and to restrict the entrance of water to such an extent that the hand will be affected only by the gradual rise and fall of the tide, and means for removing the filter from the lower end of the tube through the upper end of the tube.

8. In a device of the character described, the combination of a recording mechanism including a float extending into the water, of a tube extending into the water and enclosing the float, the tube being open at its lower end, a filter at the lower end of the tube to exclude foreign matter from the tube and to restrict the entrance of water to such an extent that the recording mechanism will be affected only by the gradual rise and fall of the tide, and means extending through the tube from the upper end thereof and connected to the filter whereby to withdraw the filter from its operative position at the lower end of the tube.

ENDRE NIELSEN.